3,824,295
PREPARATION OF ETHERS
Ronnie D. Gordon, Richardson, Tex., assignor to
Continental Oil Company, Ponca City, Okla.
No Drawing. Filed Mar. 10, 1972, Ser. No. 233,771
Int. Cl. C07c 41/00
U.S. Cl. 260—614 R                5 Claims

ABSTRACT OF THE DISCLOSURE

Symmetrical ethers are prepared by reacting an organic compound containing a halogen or alkyl sulfate group with an alkali metal hydroxide, in aqueous solution, in the presence of a catalytic amount of an organic quaternary salt and recovering from the reaction mixture the desired symmetrical ether. Typical examples of materials used are: 3-chloropropen, sodium hydroxide and trioctyl methyl ammonium chloride. The ethers are useful as solvents.

CROSS-REFERENCE TO RELATED APPLICATIONS

Ser. No. 233,714, entitled "Preparation of Alcohols and Ethers," wherein the inventor is Charles M. Starks, filed the same day as the present application and having the same assignee as the present application, concerns the preparation of alcohols and ethers by the reaction of an organic compound, containing a halogen or alkyl sulfate with an alkali metal hydroxide, in the presence of a catalytic amount of a betaine. In general the betaines give better results at higher temperatures than do the quaternary salts disclosed and claimed herein.

BACKGROUND

Ethers are particularly useful as solvents. Since the boiling points of ethers differ according to the composition, it is desirable to have available ethers of varying compositions in order to meet a variety of boiling point requirements for solvents.

Industrially, symmetrical ethers have been produced by sulfuric acid dehydration of alcohols. Another manner of preparing symmetrical ethers has been by the Williamson synthesis which uses an alkyl halide and a sodium alkoxide (both alkyl groups being the same).

The present invention provides a simple, direct method of preparing a wide variety of symmetrical ethers.

PRIOR ART

From a search of the prior art, the following references are considered to be the most pertinent and/or typical of the prior art.

U.S. Pat. No. 1,379,362 broadly teaches the preparation of dimethyl ether by the reaction of methyl chloride and an alcoholic solution of sodium hydroxide. The patent further teaches that in order to make the process commercially useful, high pressures (e.g., 20 atmospheres) are required.

U.S. Pat. No. 1,873,538 teaches the preparation of dipropyl ether by reacting propyl chloride and sodium hydroxide to form propyl alcohol and dehydrating the propyl alcohols using sulfuric acid to form the dipropyl ether.

U.S. Pat. No. 2,237,241 teaches the preparation of symmetrical ethers by reacting an alkyl halide with a metal hydroxide, using as the catalyst various polyhydric alcohols or hydroxy ethers.

Briefly, none of the references discussed in the foregoing teach my process, as described herein.

BRIEF SUMMARY OF THE INVENTION

Broadly stated, my invention is directed to a process for preparing symmetrical ethers by reacting an organic compound containing a halogen or alkyl sulfate group with an alkali metal hydroxide, in aqueous solution, in the presence of a catalytic amount of an organic quaternary salt and recovering from the reaction mixture the desired symmetrical ether.

Preferably, the organic compound is a halogen-substituted hydrocarbon.

An important feature of the process is the use of the quaternary salt, which will be described in detail hereinafter.

Other significant features of the process are that it is conducted under autogenous pressure conditions and does not require the use of an organic solvent.

DETAILED DESCRIPTION

Materials Used and Amounts of Materials Used

Suitable organic compounds include the following:

(a) Primary n-alkyl halides or alkyl sulfates, represented by the formula RZ wherein R is a $C_1$ to $C_{18}$ normal alkyl group and Z is a halogen or an alkyl sulfate group. Preferably, Z is chloride or bromide. Specific examples include methyl chloride, methyl bromide, butyl chloride, butyl bromide, butyl iodide, hexyl chloride, hexyl bromide, octadecyl chloride, octadecyl bromide, methylethylsulfate, butylmethylsulfate, hexylmethylsulfate, octadecylmethylsulfate, and octadecylethylsulfate.

(b) Dihaloalkanes represented by the formula $X(CH_2)_nX$ wherein X is a halogen, preferably chlorine or bromine, and $n$ is an integer of 1 to 20. Specific examples include dichloroethane, dibromopropane, dichlorobutane, dichlorooctane, dibromododecane, dichlorohexadecane, dibromooctadecane, and dichloroeicosane.

(c) Internally substituted mono-, di-, and poly-chlorinated or brominated alkanes containing 4 to 40 carbon atoms. Preferably, the chlorinated alkanes are mono- or disubstituted. Specific examples include 2-chlorobutane, 2,4-dichloropentane, 2-chlorohexane, 2,6-dichlorooctane, 2,18-dichloroeicosane, 2,6,18-trichloroeicosane, 2,28-dichlorotriacontane, 2,20,28-trichlorotriacontane, 2,38-dibromotetracontane, 2,38-dichlorotetracontane, and 2,20,38-trichlorotetracontane.

(d) Unsaturated alkyl halides containing 3 to 40 carbon atoms, such as 1-chloro-3-propene, 1,4-dichloro-2-butene, 2,6-dichloro-4-octene, 2,8-dichloro-6-decene, 2,18-dichloro-10-eicosene, 2,18-dibromo-10-eicosene, 2,28-dichloro-20-triacontene, 2,34-dibromo-4-dotriacontene, 4-chloro-1-triacontene, and 2,38-dibromo-10-tetracontene.

(e) Mono- and di-chloro-substituted monocyclic aromatic compounds, such as benzyl chloride and $\alpha,\alpha'$-dichloroxylene.

(f) Compounds of the type $Y—(CH_2)_nZ$ wherein $n$ is an integer of 1 to 20, Z is chloride, bromide, iodide, or an alkylsulfate group and Y is a nonreactive functional group such as —CN or —$NH_2$.

Of the foregoing materials the chlorinated or brominated hydrocarbons are considered more suitable, with the n-alkyl chlorides or bromides being preferred for reasons of economy and availability.

An aqueous solution of alkali metal hydroxide is used. More suitably, the alkali metal is sodium or potassium, but preferably is sodium, for economic reasons. The concentrations of the alkali metal in the water can be in the range of 1 to 70%. Preferably, the concentration is not less than 10% by weight.

While it is suitable to use stoichiometric amounts of the organic compound and alkali metal hydroxide (i.e., 1:1 mole ratio), preferably an excess of alkali metal hydroxide is used which can be in the range of 2 to 5 times the stoichiometric amount.

The more suitable organic quaternary salts, which are used as a catalyst in my invention, have the general formula

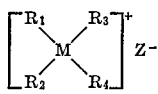

wherein M is a pentavalent ion of an element selected from the group consisting of nitrogen, phosphorus, arsenic, antimony and bismuth, $R_1$, $R_2$, $R_3$, and $R_4$ are alkyl groups containing from 1 to about 30 carbon atoms, and Z is a conventional anion derived from an organic or inorganic acid, including halides, sulfates, alkyl sulfates sulfonates and acetates. Normally, it is desirable that the alkyl substituents $R_1$, $R_2$, $R_3$, and $R_4$ contain more than a single carbon atom. Examples of suitable organic quaternary salts which can be employed as the catalyst for the exchange reaction described hereinbefore are: hexadecyltrihexylammonium bromide; trioctylethylammonium bromide; tridecylmethylammonium chloride; didodecyldimethylammonium chloride; tetraheptylammonium iodide; dioctadecyldimethyl ammonium chloride; tridecylbenzylammonium chloride; tributyldecylphosphonium iodide; triphenyldecylphosphonium iodide; tributylhexadecylphosphonium iodide; tricapryldodecylammonium p-toluene sulfonate; tribenzyldecylarsonium chloride; tetranonylammonium hydroxide; N,N,N',N'-tetramethyl - N,N'-ditetradecyl-p-xylene-$\alpha,\alpha'$-diammonium dichloride; 1 - methyl - 1 - (N-octadecanonyl - 2 - aminoethyl) - 2 - heptadecyl - 4,5 - dihydro - 1,3 - diazole methyl sulfonate; N,N,N',N'-tetramethyl-N,N'-dioctadecyl-x-dodecyl-y-xylene-$\alpha,\alpha'$-diammonium dichloride.

The preferred organic quaternary salts are those wherein M is nitrogen or phosphorus and Z is chloride or bromide ion. The most preferred organic quaternary salts are those wherein M is nitrogen and Z is chloride or bromide.

Knowing that the quaternary salts described herein are effective as a catalyst in the process of preparing symmetrical ethers described herein, any person skilled in the art can readily determine the optimum amount required. In order to make any disclosure more complete, however, I have found a preferred amount of catalyst to be from about 1 to about 5 percent by weight based on the organic compound. An amount of catalyst as low as 0.01 weight percent is suitable provided a longer reaction time is not undesirable. Similarly, an amount of catalyst as high as 20 weight percent is suitable as long as higher costs are not undesirable.

Process conditions

The process can be conducted under either batch or continuous operation, but usually is conducted as a batch operation.

The process can be conducted at a temperature in the range of 0 to 300° C., more suitably 10 to 150° C., and preferably about 30 to about 50° C.

The reaction time is not critical, being dependent on the particular materials used (e.g., type of organic compound, type of catalyst and concentration of catalyst and/or alkali metal hydroxide).

No solvent is required other than the water for making an aqueous alkali metal hydroxide solution.

The reaction is conducted under autogeneous pressure, in other words the only pressure is that which is self-generated by the materials and process conditions. It is not necessary to use intentionally created conditions in order to produce a higher pressure in the reaction system.

Upon completion of the reaction the desired symmetrical ether is removed from the reaction mass by distillation.

In order to disclose the nature of the present invention more specifically, the following illustrative examples will be given. It is to be understood that the invention is not to be limited to the specific conditions or details set forth in these examples except insofar as these limitations are specified in the appended claims.

Example 1

Diallyl ether was prepared as follows: 15.2 g. (0.2 mole) 3-chloropropene, 25 ml. of 50% NaOH aqueous solution and 0.5 g. trioctyl methyl ammonium chloride were placed in a 100 ml. reaction flask and heated to 40° C. After maintaining the admixture at 40° C. while stirring, for 4 hours, a sample of the product was analyzed by GLC (gas liquid chromatography) and found to contain one product (23% conversion-100% selectivity). The product was collected by preparative GLC and analyzed by mass spectrometry, which identified the product as diallyl ether.

Example 2

Diallyl ether is prepared using the conditions of Example 1 except it is removed from the reaction mixture by means of distillation.

Example 3

Using the conditions of Example 1, dibutyl ether is prepared using n-butyl chloride, 50% aqueous NaOH solution and tridecyl methyl ammonium chloride. The product is separated from the reaction mixture by means of distillation.

Example 4

Using the conditions of Example 1, di-2-hexyl ether is prepared using 2-chlorohexane, 50% aqueous NaOH solution and tridecylbenzylammonium chloride. The product is separated from the reaction mixture by means of distillation.

Having thus described the invention by providing specific examples thereof, it is to be understood that no undue limitations or restrictions are to be drawn by reason thereof and that many variations and modifications are within the scope of the invention.

The invention having thus been described, what is claimed and desired to be secured by Letters Patent is:

1. A process for preparing symmetrical ethers wherein the process comprises reacting a primary n-alkyl halide or alkyl sulfate, represented by the formula RZ, wherein R is a $C_1$ to $C_{18}$ normal alkyl group and Z is a halide or alkyl sulfate anion, with an alkali metal hydroxide, in aqueous solution, at a temperature in the range of about 30 to about 50° C. in the presence of a catalytic amount in the range of from about 0.01 to about 20 weight percent based on said n-alkyl halide or alkyl sulfate, of a quaternary salt and recovering from the reaction mixture by distillation the desired symmetrical ether, said quaternary salt being represented by the formula:

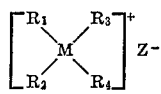

wherein (1) M is a pentavalent ion of an element selected from the group consisting of nitrogen, phosphorus, arsenic, antimony and bismuth; (2) $R_1$, $R_2$, $R_3$, and $R_4$ are alkyl groups containing from 1 to about 30 carbon atoms; and (3) Z is an anion selected from the group consisting of halides, sulfates, alkyl sulfates, sulfonates and acetates, said process being characterized further in that the amount of alkali metal hydroxide based on said n-alkyl halide or alkyl sulfate, is in the range of about 1:1 to about 5:1 on a molar basis.

2. The process of Claim 1 wherein, in the quaternary salt, M is nitrogen and Z is halide anion.

3. The process of Claim 2 wherein the alkali metal hydroxide is sodium hydroxide, the amount of alkali metal hydroxide is from 2 to 5 moles per mole of n-alkyl halide or alkyl sulfate, and the amount of quaternary salt is from about 1 to about 5 weight percent, based on the n-alkyl halide or alkyl sulfate.

4. The process of Claim 3 wherein a primary n-alkyl halide is used as a reactant.

5. The process of Claim 4 wherein the n-alkyl halide is a n-alkyl chloride.

References Cited

UNITED STATES PATENTS

| | | | |
|---|---|---|---|
| 2,237,241 | 4/1941 | Strosacker et al. | 260—614 R X |
| 1,379,362 | 5/1921 | Riesenfeld | 260—614 R X |
| 2,181,297 | 11/1939 | Britton et al. | 260—614 R X |
| 1,245,742 | 11/1917 | Lacy | 260—614 R |
| 2,989,570 | 6/1961 | Conrad et al. | 260—654 D |
| 2,874,311 | 3/1959 | Hawkins | 260—654 D |
| 1,752,049 | 3/1930 | Young | 260—654 D |
| 2,285,329 | 6/1942 | Coleman et al. | 260—654 D X |
| 2,755,319 | 7/1956 | Baggett | 260—654 D X |
| 2,291,375 | 7/1942 | Cass | 260—654 D |

FOREIGN PATENTS

| | | | |
|---|---|---|---|
| 343,930 | 11/1921 | Germany | 260—611 A |

OTHER REFERENCES

Olivier, Recueil des Travaux Chimiques des pays Bas 55 (1936), p. 1034–1035.

HOWARD T. MARS, Primary Examiner

U.S. Cl. X.R.

260—611 A, 615 R